US007505878B2

(12) United States Patent
Williams et al.

(10) Patent No.: US 7,505,878 B2
(45) Date of Patent: Mar. 17, 2009

(54) TURN AROUND OPERATIONS COST OF OWNERSHIP MODEL

(75) Inventors: Zachary C. Williams, St. Charles, MO (US); Jeremy Wallace, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 10/802,624

(22) Filed: Mar. 17, 2004

(65) Prior Publication Data

US 2004/0243382 A1 Dec. 2, 2004

(51) Int. Cl.
*G06F 7/60* (2006.01)
*G06F 17/20* (2006.01)
*G09B 25/00* (2006.01)

(52) U.S. Cl. ............................ 703/2; 434/372; 434/374

(58) Field of Classification Search ..................... 703/2; 705/410; 434/372, 374
See application file for complete search history.

(56) References Cited

U.S. PATENT DOCUMENTS 5,696,885 A * 12/1997 Hekmatpour ................ 706/59
6,725,184 B1 * 4/2004 Gadh et al. ..................... 703/2
6,748,304 B2 * 6/2004 Felke et al. ................... 701/29

OTHER PUBLICATIONS http://www.abnormal.com/~thogard/vw/h2opump.html, Water Pump Replacement into, copyright 2000-2007, updated on Sep. 3, 1997, 3 pages.*

* cited by examiner

*Primary Examiner*—Paul L Rodriguez
*Assistant Examiner*—Dwin M Craig
(74) *Attorney, Agent, or Firm*—Harness, Dickey & Pierce, P.L.C.

(57) ABSTRACT

Methods and apparatus of modeling the costs associated with a system that includes a plurality of components are provided. In accordance with a preferred form of the present invention, a method includes using a first and a second node of a tree structure to represent a first and a second operation associated with the system. A branch of the tree structure is also used to represent a first dependency between the first operation and the second operation. A determination may then be made as to whether a third node, in addition to the first node, represents the first operation. In the alternative, a determination may be made as to whether a second branch branches from the first operation.

13 Claims, 7 Drawing Sheets

TURN AROUND OPERATIONS COST OF OWNERSHIP MODEL

FIELD OF THE INVENTION

This invention relates generally to computer models for generating system ownership costs and, more particularly, computer cost models for complex, high technology systems.

BACKGROUND OF THE INVENTION

The ownership costs associated with complex systems may be difficult to thoroughly understand for a variety of reasons. First, these systems typically include a multiplicity of interrelated components. Thus, the sheer number of components poses one set of challenges. Moreover, because these components interrelate to one another, the maintenance costs of one component may reflect in part, or in whole, costs associated with maintaining another component. Accordingly, the accounting of certain expenses may be duplicated or missed. Likewise, an operation on one component may involve, or require, operations on another component. Thus, the costs associated with the various operations interrelate to each other. The cost structure of a complex system may therefore be convoluted enough to evade ready understanding.

Moreover, these complex systems may be associated with larger systems involving additional complex systems. One exemplary complex system that incorporates other complicated machines is the Space Shuttle. Clearly, the Space Shuttle is a complex system that incorporates many high technology subsystems including for example, three Space Shuttle Main Engines (SSME). In turn, each SSME includes numerous assemblies, sub-assemblies, and components such as an electronics subsystem a power head, an injector, and a nozzle. In turn, the de-composition may continue until the smallest or simplest components are identified (e.g. a one-piece propellant duct in the power head).

Because the operation of such complex systems has proven to be costly, institutional pressure exists to reduce the cost of operations. However, reducing the cost of ownership associated with these systems requires an understanding of the complex cost structure. Thus, a need exists for a simple, easy to manipulate, cost model for such complex systems.

SUMMARY OF THE INVENTION

It is in view of the above problems that the present invention was developed. The present invention includes methods and apparatus for modeling the ownership costs of complex systems.

In a first preferred embodiment of the present invention, a computer is provided for modeling costs associated with a complex system. The computer includes a memory that stores a tree structure. The tree structure includes a first node representing a first operation associated with the system and a second node representing a second operation. Additionally, the tree structure includes a branch branching from the first node and representing a first dependency between the first and the second operations. The computer also includes a processor that may determine whether a second branch branches from the first node. In the alternative, the computer may determine whether a third node represents the first operation.

In a preferred form of the present, a method is provided that includes using a first and a second node of a tree structure to represent a first and a second operation associated with a system. A branch of the tree structure is used to represent a first dependency between the first operation and the second operation. A determination may then be made as to whether a third node, in addition to the first node, represents the first operation. In the alternative, a determination may be made as to whether a second branch branches from the first operation.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
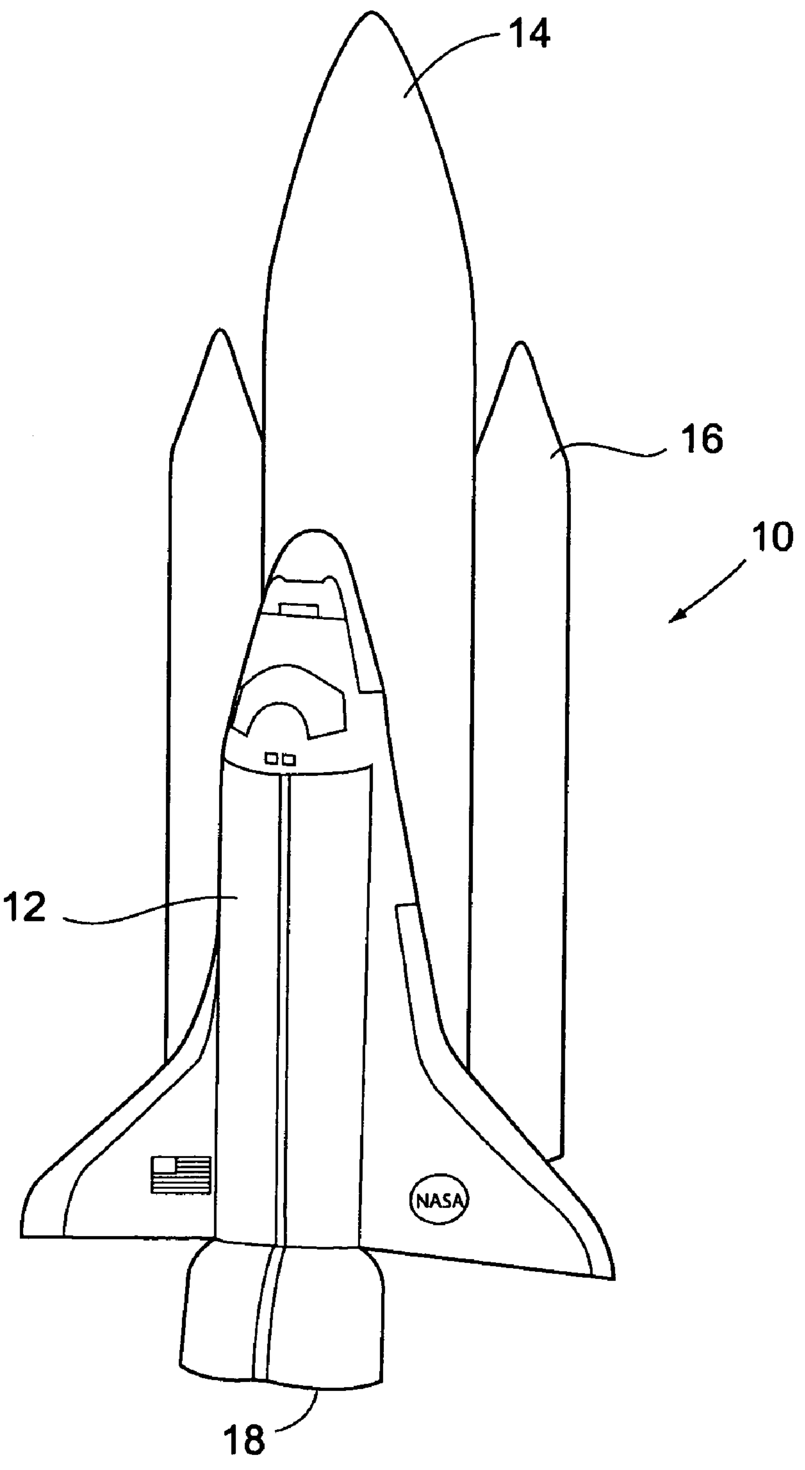
FIG. 1 illustrates an exemplary complex system.

Referring to the accompanying drawings in which like reference numbers indicate like elements, FIG. 1 illustrates an exemplary complex system 10, the Space Shuttle. At launch, the Shuttle 10 contains numerous complex subsystems including the Shuttle Orbiter 12, an External Tank 14, a pair of Solid Rocket Boosters 16, and three Space Shuttle Main Engines 18 (SSME), among many others. Not only is the Shuttle 10 complex, but also its subsystems are also complex, some with thousands of interrelated components.

Figure 2:
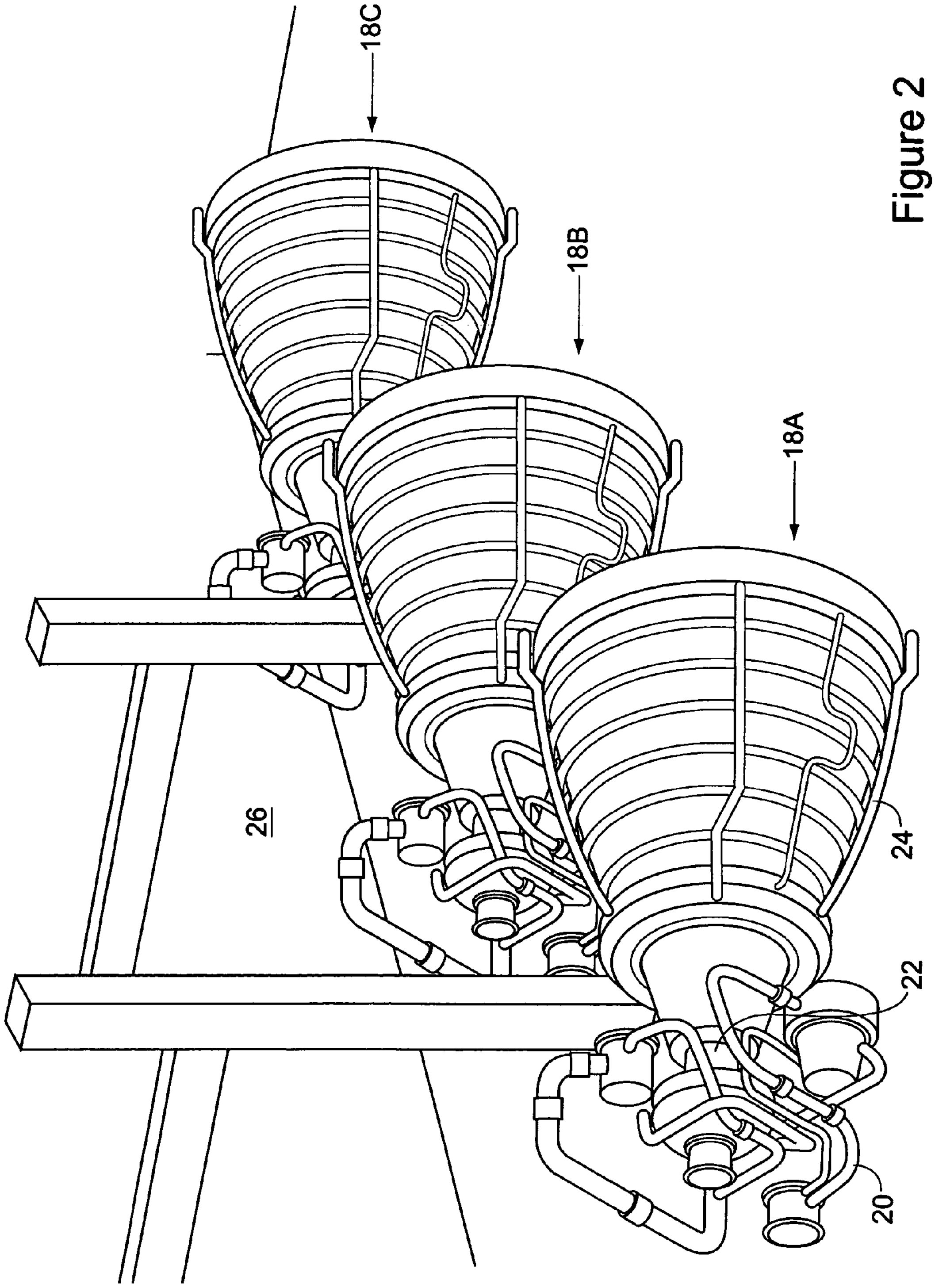
FIG. 2 illustrates a complex subsystem of the system shown in FIG. 1.

For instance, FIG. 2 shows several SSMEs 18A to 18C removed from the orbiter 12 for pre-flight servicing. The SSMEs 18 are among the most complex capable machines ever developed (each creating over 12,000,000 horsepower) and are available from the Boeing Company of Chicago, Ill. Generally, an SSME 18 may be further subdivided into a power head 20, an injector 22, and a nozzle 24. In turn, each of these subassemblies may be further decomposed into components. For instance, the power head 20 includes several turbo-pumps, numerous valves, ductwork, and associated instrumentation and controls.

Prior to the initial flight of an SSME 18, the engine 18 must be manufactured, tested, and installed on the Orbiter 12. These processes each involve numerous lower level operations on the engine 18, the various subassemblies 20 to 24, and the individual components thereof.

Moreover, because of specialized requirements associated with the operations, the engine is typically moved between various operation and test stations. Furthermore, following each flight the engines 18 must be inspected, serviced, and if necessary repaired and re-tested. FIG. 2 shows the engines 18A to 18C in a typical maintenance bay 26.

Figure 3:
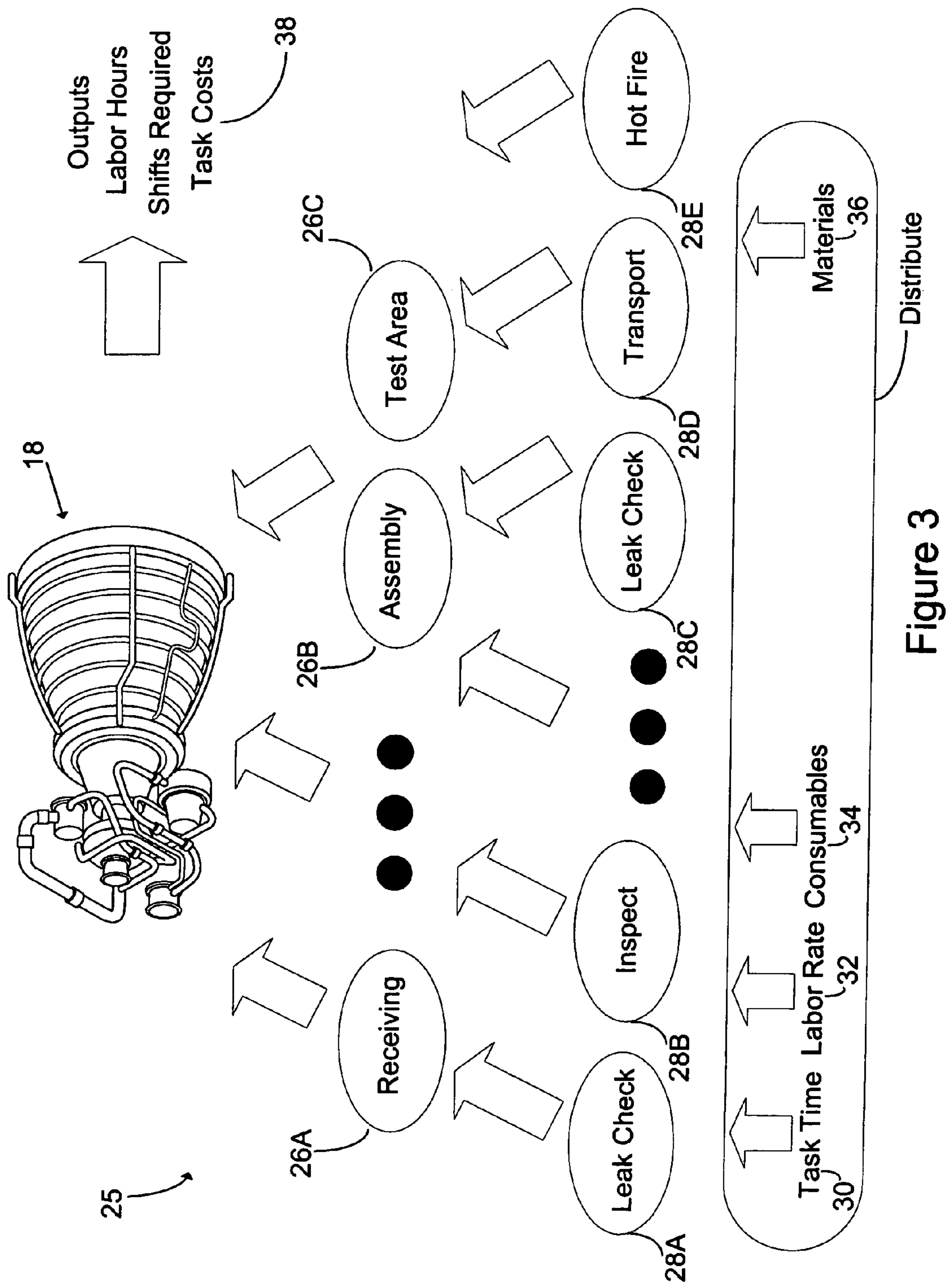
FIG. 3 illustrates the processing of the complex subsystem shown in FIG. 2.

With reference now to FIG. 3, a process 25 for preparing a new engine 18 for flight is shown. As noted, the engine preparation 25 occurs in several locations including a receiving area 26A, an assembly area 26B,and a test area 26C. In these locations 26, numerous operations 28 are performed on the engine 18 as shown, these exemplary operations include assembling the engine 28A, inspecting the assembled engine 28B, leak checking the fluid systems 28C, transporting the engine to a test stand 28D, and hot firing the engine 28E. Generally, some of these operations may occur in parallel to save time and resources. Though many pairs of operations require that one operation (e.g. the assembly 28A) occur before the other operation (e.g. the leak check 28C).

Figure 4:
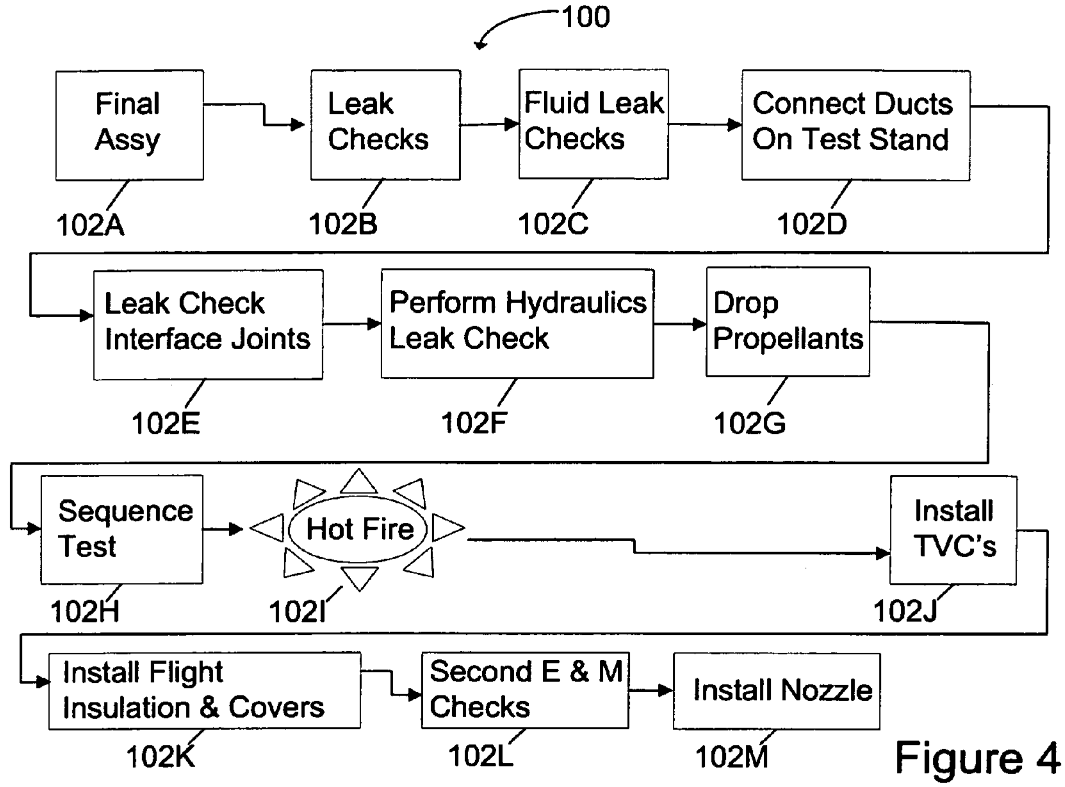
FIG. 4 illustrates another process in accordance with a preferred form of the present invention.

Also as depicted, each operation carries with it certain costs or expenses, and likewise requires resources to perform. In particular, each operation 28 generally requires some time 30 to occur. Because the engine 18, and associated hardware and facilities, are usually financed, the task time 30 may be associated with a financing cost. Similarly, each operation consumes some human labor with an associated labor pay rate 32. Moreover, some operations will require materials. The materials may be consumables 34 or nonconsumables 36. Either type of material 34 or 36 of course has associated therewith a cost. Assuming for the moment that all of the operations are sequential (occurring one after the other), FIG. 4 illustrates a simplified process flowchart for a typical engine 18. The process 100 includes numerous operations 102 as shown.

Figure 5:
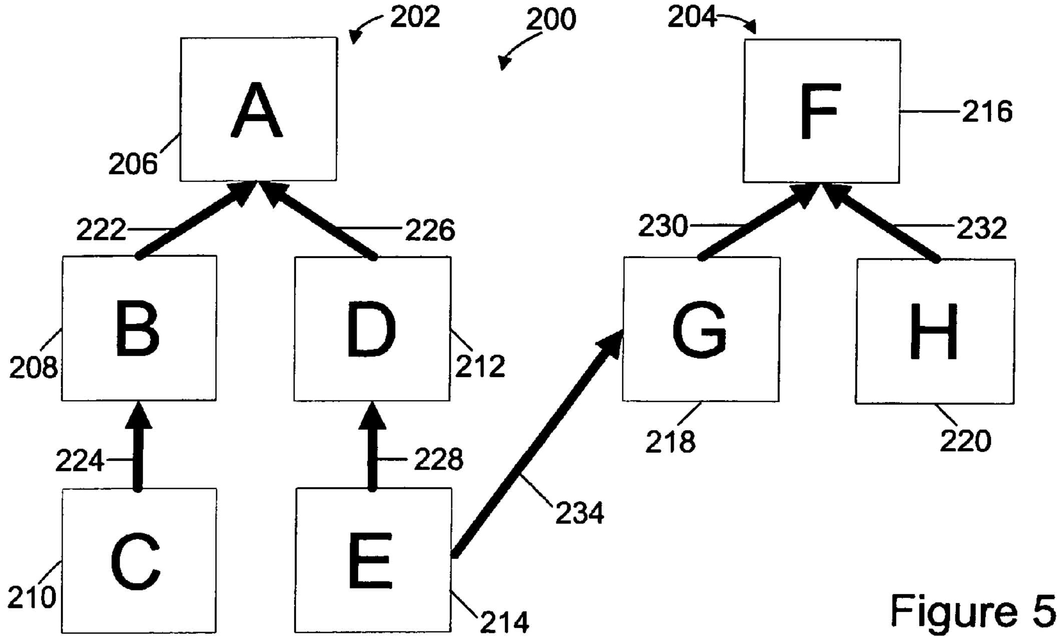
FIG. 5 illustrates a model in accordance with another preferred form of the present invention.

In accordance with the principals of the present invention, the process (or engine) may also be modeled as illustrated in FIG. 5. The model 200 generally includes numerous tree structures 202 and 204 (ignoring the branch 234 to be discussed later). The tree structures are, in turn, composed of nodes 206 to 220 that represent operations on the engine and its lower level constituents. Branches 222 to 234 link the nodes to represent the dependence of a particular operation upon other operations. The model 200, therefore, may include a module, function, or algorithm, to determine the cost of a particular operation and all operations upon which it depends either directly or indirectly.

In particular, the nodes may represent the removal of components A to H, as represented by tree structures 202 and 204. For tree structure 202, the depiction indicates that the removal of component A requires the removal of components B and D. Likewise, the removal of component B requires the removal of component C while the removal of component D requires the removal of component E. Because all of these operations have costs associated with them, the removal of component A incurs the cost associated with first removing components B to E and, finally, the removal of component A itself. Thus, the removal of component A incurs a cost that is generally the sum of the costs associated with the removals of the components A to E.

The model 200, as shown in FIG. 5, may also include constraints that reflect simplifying assumptions. In particular it may be assumed that each operation is only represented in one tree structure. Thus, node 208 may appear on tree structure 202, but not tree structure 204. Moreover, another assumption may be made that one unique path exists between any two nodes within a tree structure. Thus, for example, the only path between nodes 214 and 206 is through branches 228 and 226. Furthermore, it may be assumed that all of the operations occur sequentially (see the illustration of the process 100 of FIG. 4). These assumptions may be checked by functions built into the model 200. Thus once the model 200 is sufficiently complete to document the process, engineers, managers, customers, and others may access the model 200 and manipulate it to study the costs of owning the modeled system. Of course, sections of the process may also be modeled alone and studied accordingly.

Furthermore, the nodes 206 to 220 may be modified to reflect actual, or proposed, design changes of the underlying system or changes to the process 100. For example, node 210 could be selected and deleted from tree structure 202. In the alternative, the costs associated with node 210 may be modified or a new node may be inserted into one of the tree structures 202 or 204. Accordingly, an interested party may access the model, and run various "what if" analysis of the underlying process to identify cost savings and process simplifications. Yet another simplifying assumption that may be made to aid in the what if analysis is that only one node may be changed at a time.

It will be understood that the branches 222 to 234 may similarly be modified, deleted, or added. In the alternative, it will be understood that modifying a node can indicate modifying a branch associated with the node since changes in operations may include changing the dependencies of the operation. It will also be noted that dependencies and operations may have time delays associated therewith. For example, painting a component generally requires time for the paint to dry.

Figure 6:
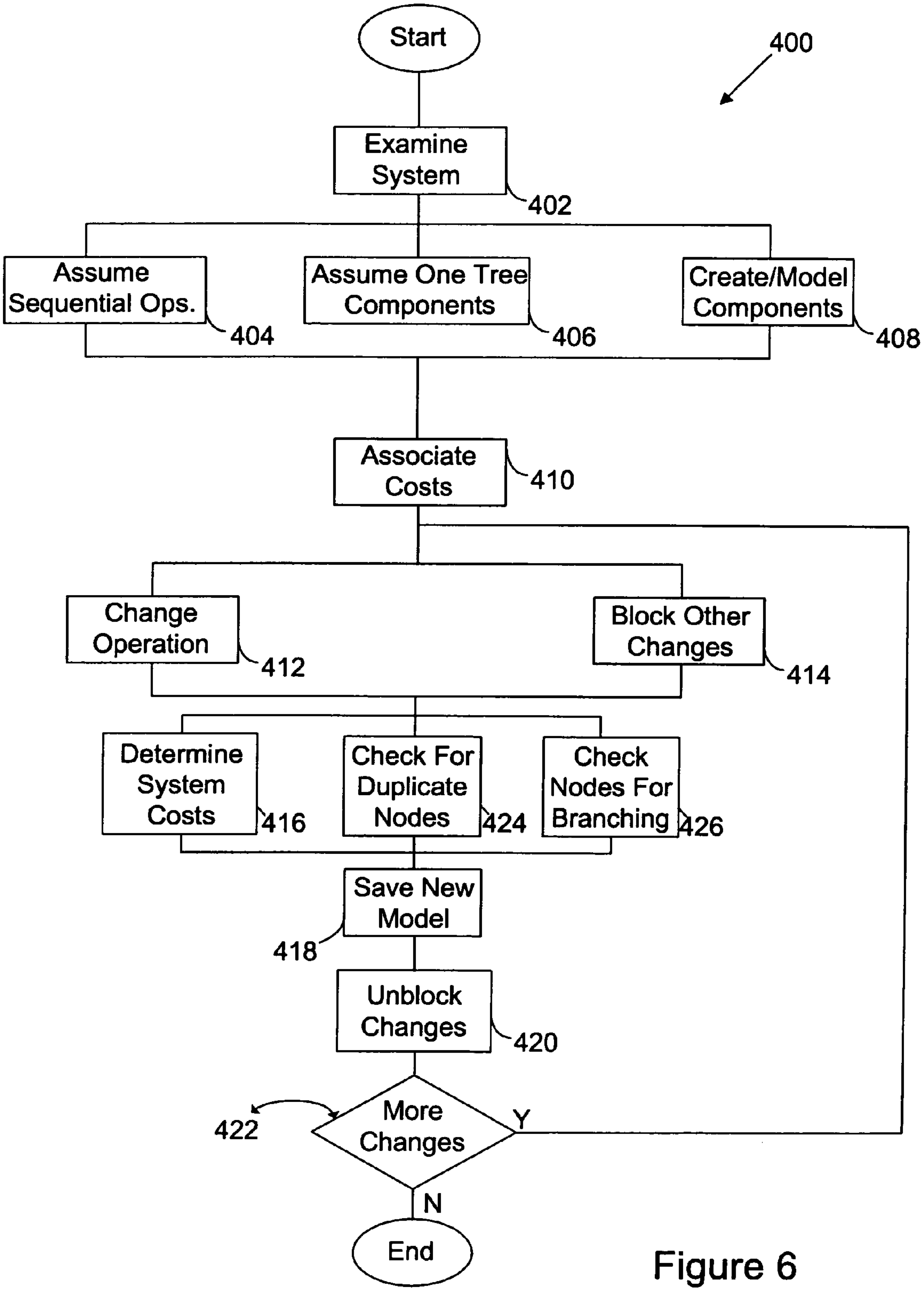
FIG. 6 illustrates a method in accordance with a preferred form of the present invention.

Turning now to FIG. 6, a flowchart 400 in accordance with a preferred form of the present invention is illustrated. Initially, the complex system and the process may be examined to identify the various operations and dependencies. See block 402. Simplifying assumptions may be made, as indicated by blocks 404 and 406. For instance, it may be assumed that all operations are sequential and that the nodes representing the various operations may only appear in one tree structure. Costs may then be associated with each operation as in block 410.

In block 412, a node of interest may then be selected and modified. At about that time, the ability to modify other nodes may be blocked or disabled as in block 414. Additionally, block 416 may determine the system level cost (i.e. the cost associated with the highest node in the tree structure under study (see FIG. 5). If desired, the current revision of the model may be saved so that further study of the changed process is possible. See block 418.

Once the current revision is either saved or further modifications are enabled (in block 420) more modifications may be studied as indicated by decision 422. If no more modifications to the process will be studied, the analysis may terminate. Otherwise, the process may return to block 412 for further analysis. In particular, a search for duplicate nodes may be performed as illustrated at 424. Such duplicate nodes represent potential savings because if the associated operation is followed by all of the operations dependent thereon, the operation need not be duplicated for each dependent operation. Likewise, the model 200 may include a function to check for nodes with multiple branches branching therefrom (e.g. node 214) by determining the number of branches leading from each node as at 426. These multiple branching nodes 214 also indicate cost savings because they too indicate operations that should be followed by all of the dependent operations.

Typically most operations will be permissive. That is, for example, operation 208 may be performed after operation 210. But operation 208 need not be performed for a given instance of process 100 (FIG. 4). More particularly, while a panel may have been removed in operation 210, not every component under the panel need be replaced.

Figure 8:
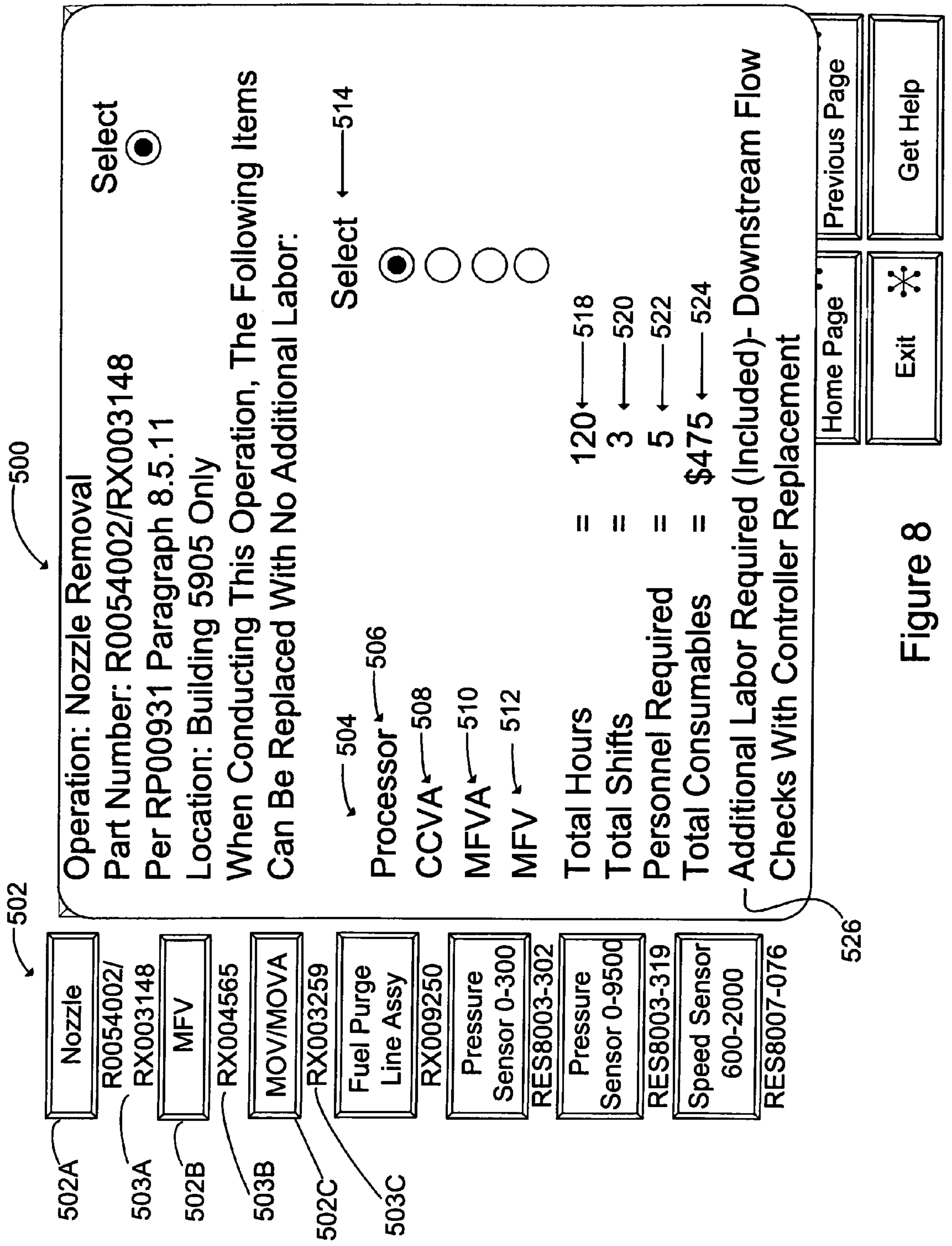
FIG. 8 illustrates a graphical user interface in accordance with a preferred embodiment of the present invention.

However some operations may require the performance of additional operations thereafter. For instance, replacement of an SSME controller necessitates sequencing the valves on the engine to prove that the controller works. Thus, a flow check is required after the controller is replaced. Thus, branch 214 may be designated as a mandatory branch to indicate that operation 208 must occur some time after operation 210. Thus, another function in the model 200 may check for the presence of mandatory branches 218 from the current operation 210. When detected, a note or warning (see, for example, note 526 on FIG. 8) to the analyst may be provided to indicate to the user that additional costs must be incurred after the currently selected operation.

Figure 7:
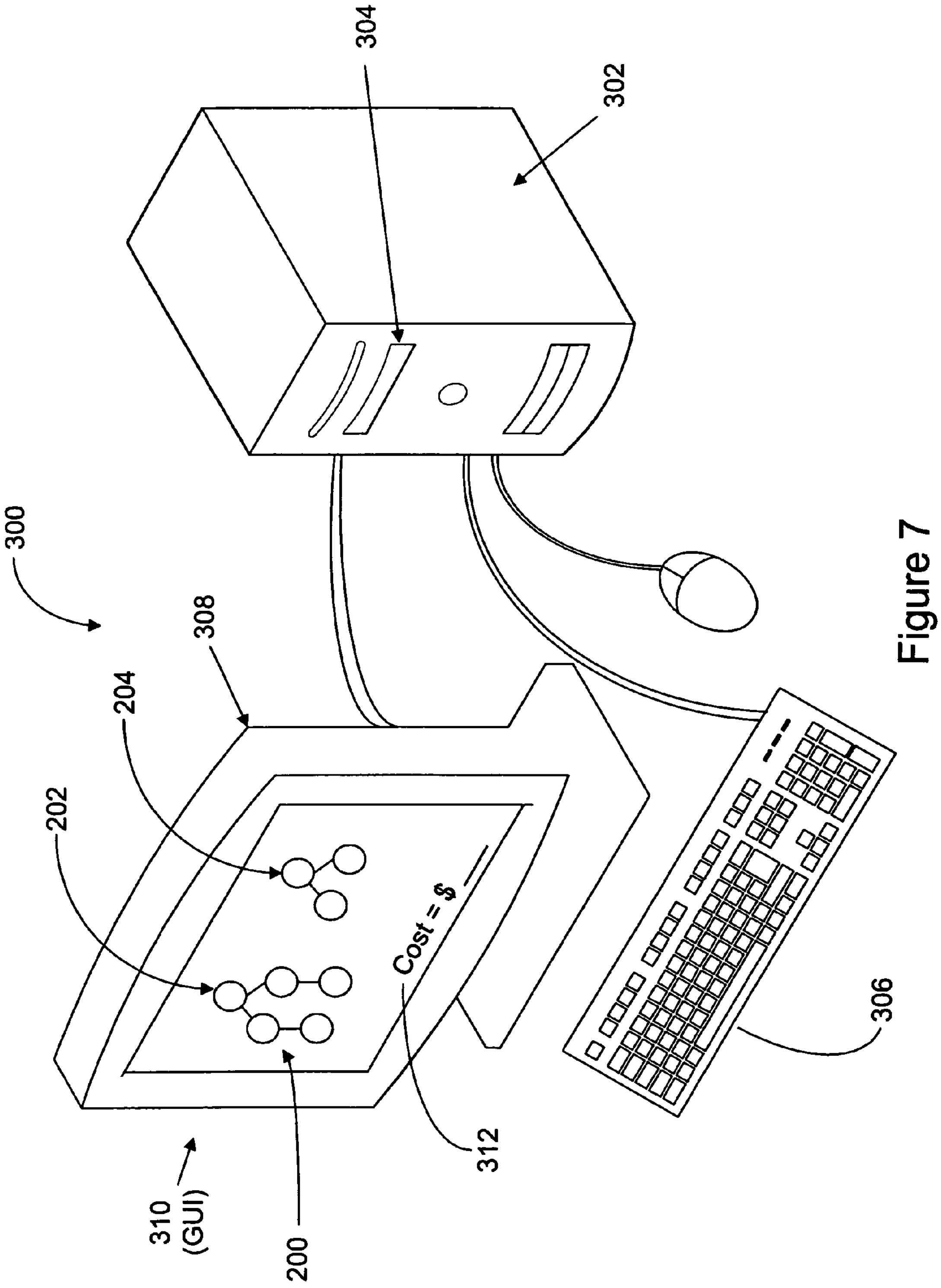
FIG. 7 illustrates a computer in accordance with a preferred embodiment of the present invention.

Of course, the model 200 or analysis 400 (see for example FIGS. 5 or 6 respectively) may be implemented on a computer. In FIG. 7, such a computer 300 is illustrated. The computer 300 typically includes a processor (shown schematically as the computer tower 302), a memory 304 (e.g. a hard drive, a floppy drive, or RAM), a keyboard and other input devices 306 and a display 308, all of which are well known in the art. The model may be stored in the memory 304 with the user viewing the model on the display 308. In turn, the user may access the model 200 and make modifications via the input devices 306. Of course, the processor 302 manipulates the model according to the modifications and may store the revision in the memory 304.

In one exemplary embodiment, the computer 300 displays a graphical user interface 500 (GUI) to enable the user to manipulate the model 200. See FIG. 8. The GUI includes an array of operation selection buttons 502. These buttons 502 enable the user to select an operation for modification by (for example) clicking on an appropriately labeled button. Thus, selecting button 502A causes information regarding the nozzle replacement to be displayed.

In particular, the operations that may be performed after the nozzle operation (associated with button 502A) without incurring additional costs may be displayed in a list 504. Herein, of course, it is recognized that the phrase "no additional cost "means no additional cost beyond that of the process(es) so indicated. For example, the SSME processor may be removed in operation 506 for only the additional cost of removing the connectors from the processor and mechanically uncoupling the controller from the engine. That is, once the nozzle operation is complete, the removal of the processor is dependent on no other operations (i.e. the processor removal is at the bottom level of a tree structure in the model 200 of FIG. 5). Note also that, operation identifiers 503A unique to each operation may be associated with the nodes so that duplicate nodes can quickly be identified.

A series of buttons 514 may also be provided to allow the user to access information regarding the dependent processes 506 to 512. Additionally, the various costs 518 to 524 associated with the selected operation 502A (the nozzle operation) are displayed.

Comment 526 indicates an additional cost that will eventually have to be incurred because of the nozzle replacement. It will be understood that the comment 526 arises from a check performed on the branches 222 to 234. The test determines whether the selected operation 502A has a mandatory branch leading from the node associated with the operation. If so, a comment 526 is generated indicated that the operation represented by the node at the terminal end of the branch must be performed following the selected operation 526.

In view of the foregoing, it will be seen that the several advantages of the invention are achieved and attained. In accordance with the preferred embodiments of the present invention, an inexpensive method of modeling complex processes is provided. Moreover, cost savings and cost avoidances may be identified during the modeling of the process, or even automatically after the modeling. Moreover, a tool is provided that quickly and conveniently allows users to manipulate the model to redesign the process.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system for facilitating the management of costs associated with performing a plurality of processes to manufacture, service and/or maintain an aerospace system incorporating a plurality of physical components, the system comprising a processor, memory, and a user interface, the processor configured with the memory to execute processor-executable instructions to perform the following:

represent in said memory each process as a set of performable operations;

associate each operation with a cost of performing the operation;

receive via said user interface a selection of an operation performable in a first of the processes;

determine whether the selected operation is a duplicate of another operation performable in the first process and/or performable in a second of the processes; and based on the determination, issue a notification via the user interface as to a possible reduction of costs by elimination of a duplicate performance of the selected operation;

the processor and memory configured to identify, from a plurality of aerospace work and/or test station locations at which the plurality of processes are performed and between which at least part of the aerospace system is moved, one or more station locations for performing the selected operation.

2. The system of claim 1, wherein the processor and memory are configured to:

identify one or more operations dependent on performance of the selected operation; and issue a notification via the user interface as to costs associated with the identified dependent operations.

3. The system of claim 1, wherein the processor and memory are configured to:

determine whether an operation is a mandatory operation performable downstream of the selected operation or a permissive operation that need not be performed; and based on the determining, issue a notification via the user interface as to costs associated with the mandatory operation.

4. The system of claim 1, wherein the processor and memory are configured to modify a representation of one or more of the processes based on user input.

5. The system of claim 1, wherein the processor and memory are configured to combine representations of two or more processes based on user input.

6. The system of claim 1, wherein the aerospace system comprises an aerospace vehicle.

7. The system of claim 1, wherein the processor and memory are configured to represent each process as a set of sequential operations and to display a list of operations performable after the selected operation without incurring cost beyond any cost of the operations performable after the selected operation.

8. A processor-performed method of facilitating the management of costs associated with performing a plurality of processes to manufacture, service and/or maintain an aerospace system incorporating a plurality of physical components, the method performed by a processor configured with memory and a user interface, the method comprising:

the processor representing in the memory each process as a set of sequential operations;

the processor receiving from a user via the user interface a selection of one of the operations of a first of the processes;

the processor determining whether the first process is a first sub-process of a second process, and whether the selected operation is duplicated in a second sub-process of the second process;

based on the determining, the processor issuing a notification via the user interface as to a feasibility of combining performances of the sub-processes; and the processor identifying, from a plurality of aerospace work and/or test station locations at which the plurality of processes are performed and between which at least part of the aerospace system is moved, one or more station locations for performing the selected operation.

9. The method of claim 8, further comprising:

the processor identifying one or more operations dependent on performance of the selected operation; and the processor notifying the user as to costs associated with the identified dependent operations.

10. The method of claim 8, further comprising:

the processor determining whether an operation is a mandatory operation performable downstream of the selected operation or a permissive operation that need not be performed; and based on the determining, the processor notifying the user as to costs associated with the mandatory operation.

11. The method of claim 8, further comprising the processor modifying a representation of one or more of the processes based on user input.

12. The method of claim 8, further comprising the processor combining representations of two or more processes based on user input.

13. The method of claim 8, wherein the aerospace system comprises an aerospace vehicle.

* * * * *